United States Patent
Shoshan et al.

(10) Patent No.: US 11,636,592 B2
(45) Date of Patent: Apr. 25, 2023

(54) MEDICAL OBJECT DETECTION AND IDENTIFICATION VIA MACHINE LEARNING

(71) Applicant: International Business Machines Corporation, Armonk, NY (US)

(72) Inventors: Yoel Shoshan, Haifa (IL); Vadim Ratner, Haifa (IL)

(73) Assignee: International Business Machines Corporation, Armonk, NY (US)

(*) Notice: Subject to any disclaimer, the term of this patent is extended or adjusted under 35 U.S.C. 154(b) by 236 days.

(21) Appl. No.: 16/932,115

(22) Filed: Jul. 17, 2020

(65) Prior Publication Data

US 2022/0020143 A1 Jan. 20, 2022

(51) Int. Cl.
- *G06N 20/00* (2019.01)
- *G06T 11/20* (2006.01)
- *G06T 7/00* (2017.01)

(52) U.S. Cl.
CPC .......... *G06T 7/0012* (2013.01); *G06N 20/00* (2019.01); *G06T 11/20* (2013.01); *G06T 2207/20081* (2013.01); *G06T 2207/20084* (2013.01); *G06T 2207/30096* (2013.01); *G06T 2210/12* (2013.01)

(58) Field of Classification Search
CPC ............. G06T 7/0012; G06T 11/20; G06T 2207/20081; G06T 2207/20084; G06T 2207/30096; G06T 2210/12; G06N 20/00; G06N 3/0445; G06N 3/0454; G06N 3/084; G06K 9/6262; G06K 9/6271
See application file for complete search history.

(56) References Cited

U.S. PATENT DOCUMENTS

| | | | |
|---|---|---|---|
| 6,553,356 B1 | 4/2003 | Good | |
| 2021/0012089 A1* | 1/2021 | Shlens et al. | G06K 9/00208 |
| 2021/0383533 A1* | 12/2021 | Zhao et al. | G06K 9/628 |

FOREIGN PATENT DOCUMENTS

| | | | | |
|---|---|---|---|---|
| WO | 2021126370 | * | 6/2021 | ............... G06T 7/11 |
| WO | 2021138749 | * | 7/2021 | |

OTHER PUBLICATIONS

Chavdarova et al., "Deep Multi-Camera People Detection", arXiv:1702.04593v3 [cs.CV], Jul. 23, 2017, 8 pages, <https://arxiv.org/pdf/1702.04593pdf>.

(Continued)

*Primary Examiner* — Gandhi Thirugnanam
*Assistant Examiner* — Michael Adam Shariff
(74) *Attorney, Agent, or Firm* — Monchai Chuaychoo

(57) ABSTRACT

An approach for improving object detection performance by using bilateral organ information disclosed. The approach comprises introducing a penalty term to an object localization model. The penalty term encourages the model to identify same physical regions (actual same physical location in the patient's body) in multiple images, which create an image of the same organ. The approach includes a sub-component of the model that can output an entity embedding, in additional to the conventional classification and localization prediction. During optimization process, similar entity embedding for the same logical entity are encouraged, and similar entity embedding for different logical entities are discouraged.

20 Claims, 5 Drawing Sheets

(56) References Cited

OTHER PUBLICATIONS

Gardezi et al., "Breast Cancer Detection and Diagnosis Using Mammographic Data: Systematic Review", Journal of Medical Internet Research, Jul. 26, 2019, 39 pages, <https://www.ncbi.nlm.nih.gov/pmc/articles/PMC6688437/?report=reader>.
Geras et al., "High-Resolution Breast Cancer Screening with Multi-View Deep Convolutional Neural Networks", arXiv:1703.07047v2 [cs.CV], Nov. 6, 2017, 9 pages, <https://www.researchgate.net/publication/315492554_High-Resolution_Breast_Cancer_Screening_with_Multi-View_Deep_Convolutional_Neural_Networks>.
He et al., "Mask R-CNN", arXiv:1703.06870v3 [cs.CV], Jan. 24, 2018, 12 pages, <https://arxiv.org/abs/1703.06870>.
Jung et al., "Detection of masses in mammograms using a one-stage object detector based on a deep convolutional neural network", PLOS ONE, Sep. 18, 2018, 16 pages.
Teuwen et al., "Soft tissue lesion detection in mammography using deep neural networks for object detection", 1st Conference on Medical Imaging with Deep Learning (MIDL 2018), Amsterdam, The Nethedands, 9 pages, <https://openreview.net/forum?id=rycG7Zhof>.

* cited by examiner

MEDICAL OBJECT DETECTION AND IDENTIFICATION VIA MACHINE LEARNING

BACKGROUND

The present invention relates generally to object detection, and more particularly to detecting medical conditions by machine learning.

Object detection is a technology related to vision and image processing that defines detecting instances of various objects of a certain environment (e.g., humans, cars, etc.) in digital images and videos. Machine learning (ML) has become a vital part of medical imaging research. Some requires the use of deep learning, a convolutional neural network (e.g., CNN, R-CNN, etc.) for discerning and identified potential problems (e.g., cancer, etc.) based on the medical images.

SUMMARY

Aspects of the present invention disclose a computer-implemented method, a computer system and computer program product for optimizing a loss function associated with image analysis. The computer implemented method may be implemented by one or more computer processors and may include identifying one or more ground truth entities based on one or more image data; representing, using a machine-learning model, one or more anchors associated with the ground truth entities; creating, on top of a classification of the machine learning model, a first identity vector and a second identity vector based on the one or more modified anchors; calculating a penalty value based on the first identity vector and the second identity vector; and optimizing a loss function of the machine learning model based on the penalty value.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
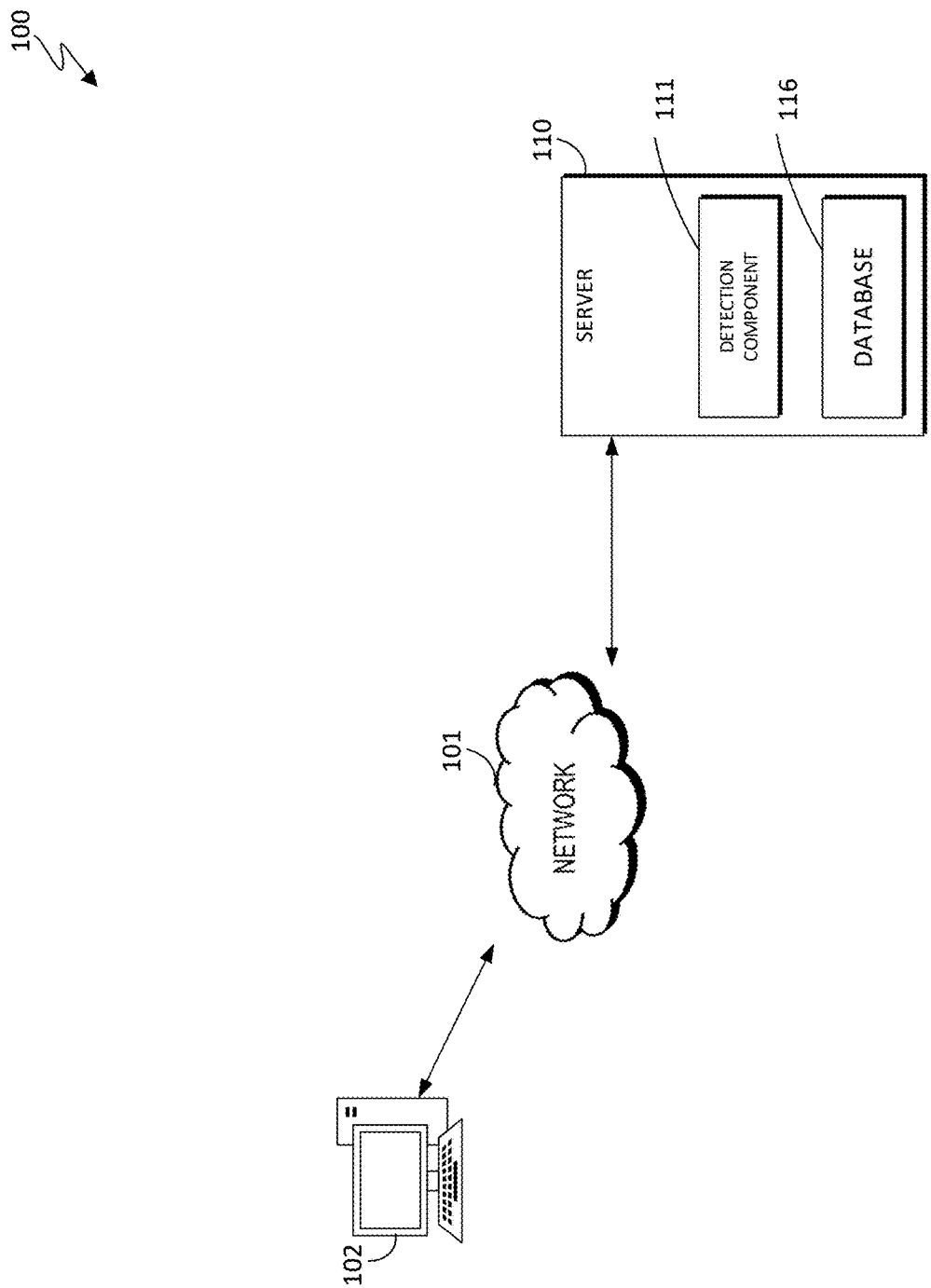
FIG. 1 is a functional block diagram illustrating an image detection model environment, designated as 100, in accordance with an embodiment of the present invention.

Embodiments of the present invention provides an approach for recognizing medical problems (e.g., cancer, lesions, tumors, etc.) based on medical images through the use of machine learning (e.g., CNN, R-CNN, etc.). The approach adds a new finding detection model based on object detection neural networks. Any a non-restricting example, RetinaNet which is a state-of-the-art one-stage object detector that use a CNN (convolutional neural network). RetinaNet is a single, unified network composed of a backbone network and two task-specific subnetworks. The backbone is responsible for computing a convoluted feature map over an entire input image and is an off-the-self convolution network. The first subnet performs classification on the backbones output; the second subnet performs convolution bounding box regression. Examples for additional object detection neural network models are DE;TR, faster-rcnn.

The approach introduces a novel penalty term to an object localization model. This term encourages the model to identify same physical regions (actual same physical location in the patient body) in multiple images, which are projections of the same organ (or organ sub-part). For example, the image of organs can include LCC (left craniocaudal) view and LMLO (left mediolateral oblique) view in mammography. For this purpose, the ROI proposal sub-component of the model outputs an entity embedding, in additional to the conventional classification and localization prediction. During the optimization process, similar entity embedding for the same logical entity are encouraged, and similar entity embedding for different logical entities are discouraged.

Another embodiment, the approach sits on top of a back-bone neural network-based detection architecture (e.g., CNN, R-CNN, etc.). These detection models usually have "anchors" which includes many bounding boxes in different locations and sizes. The model is then trained using standard neural network optimizers (e.g., SGD, ADAM, etc.) and per such anchor, the level of "objectness" (is there an object there) and its class are predicted. Additionally, some modifications of the bounding box are regressed in the optimization process to make the anchor site more tightly on the detected object. For example, during examining images from mammography for problems (mostly cancer) radiologists are given multiple views of the same organ side. While not known exactly how (partially guideline and partially intuition/experience) radiologist combine the information from both views to try and increase their specificity. For example, if a lesion is seen only in one view, but not in the other, it may be due to super-position of multiple layers of tissues which resemble a lesion. In such case, a radiologist may be less suspicious of this case and tell the patient to go home and return for the next regular screening check. The embodiment combines information from both views to improve both sensitivity and specificity of cancer detection from mammography based on medical images.

Another embodiment, the approach sits on top of a back-bone neural detection architecture (e.g., RetinaNet, etc.). The approach adds a 1 d k-sized embedding to each anchor. The embedding is encouraged to be identical when it is generated for the same biological/physical entity (i.e., lesion) and different when it is not. Furthermore, an optional distance metrics (e.g., L1, L2, cosine distance etc.). It is noted that the distance is measured between the embeddings that corresponds to actual entities.

Embodiments of the present invention may recognize one or more of the following facts, potential problems, potential scenarios, and/or potential areas for improvement with respect to the current state of the art: i) multi-step and single match pair instead of joint pair matching (i.e., mammography dual view mass correspondence), ii) detection/detectors that doesn't not rely on same entity such as exhibited by current detectors (e.g., focal loss, YOLO) and iii) relying on classification/metric learning without detectors unlike systems implemented by FaceNet and Triple loss architecture.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating an image detection model environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Image detection model environment 100 includes product network 101, client computing device 102 and server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, client computing device 102 and other computing devices (not shown) within image detection model environment 100. It is noted that other computing devices can include, but is not limited to, client computing device 102 and any electromechanical devices capable of carrying out a series of computing instructions.

Server 110 and client computing device 102 can be a standalone computing device, a management server, a web server, a mobile computing device, or any other electronic device or computing system capable of receiving, sending, and processing data. In other embodiments, server 110 and client computing device 102 can represent a server computing system utilizing multiple computers as a server system, such as in a cloud computing environment. In another embodiment, server 110 and client computing device 102 can be a laptop computer, a tablet computer, a netbook computer, a personal computer (PC), a desktop computer, a personal digital assistant (PDA), a smart phone, or any other programmable electronic device capable of communicating other computing devices (not shown) within image detection model environment 100 via network 101. In another embodiment, server 110 and client computing device 102 represents a computing system utilizing clustered computers and components (e.g., database server computers, application server computers, etc.) that act as a single pool of seamless resources when accessed within image detection model environment 100.

Client computing device 102 can be a include a cluster of medical imaging machines and medical diagnostic platforms.

Embodiment of the present invention can reside on server 110. Server 110 includes detection component 111 and database 116.

Detection component 111 provides the capability of detecting/identifying cancerous lesions in multi-view medical images with an improved performance over existing techniques, and especially to improve detection specificity. For example, in an existing technique, using a detection model (such as using RetinaNet), a user may use naïve implementation and extend it to handle multiple views. Using two views of the mammogram, LLC and LMLO (left chest CC view, and left chest MLO view), detection component 111 would be able to regress and classify anchors for both images. The input into the system would include at least, two images, and the output would be the level of objectiveness and classification prediction per anchors that are spread on both images. However, embodiment includes two elements (e.g., ENTITY and PENALTY) added to detection component 111 in order to improve detection specificity. Modern detectors in neural network utilizes multiple anchors (e.g., position, size of b-box, classification vector, etc.) to represent possible location of elements (from the image). B-box is defined as bounding-box, a term used in machine learning as in relates to object classification/identification based on images.

Figure 2:
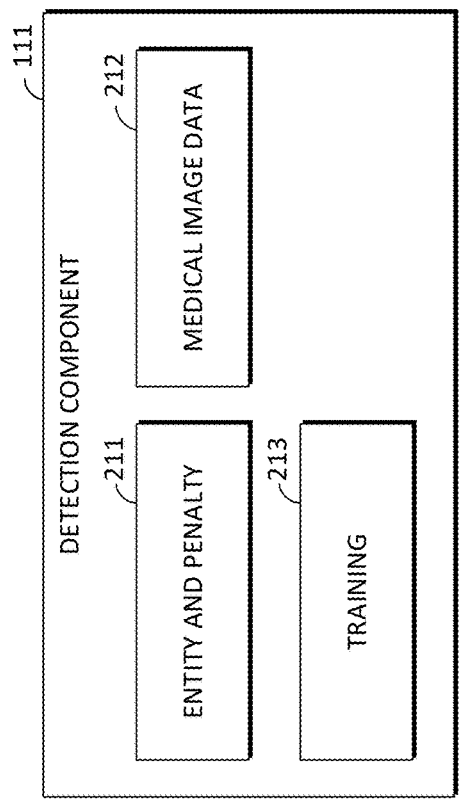
FIG. 2 is a functional block diagram illustrating detection component 111, designated as 200, in accordance with an embodiment of the present invention.

Embodiment modifies an existing anchor as an ENTITY (identity vector) by embedding additional information (i.e., 1 d vector, k-sized) which describes an entity (physical entity in the world). The "identity vector" is a vector of scalars which represents an encoding of identity. It is noted that all anchors have identity outputs, but current embodiment do not only add to the specific anchors that already have it. This concept will be explained in greater details regarding to entity and penalty component 211 (FIG. 2).

Furthermore, embodiment adds a penalty concept to the optimization goal (i.e., improving accuracy of prediction). The PENATLY is applied to a loss function in terms distance where the "penalty" increases with proportion to the distance between the output ENTITY embedding of the same entity. For example, there is a mass in a certain location, which the model detects in both LCC and LMLO views. Typically, a perfect loss function value in terms of classification, b-box (bounding-box) regression and newly added ENTITY term, would be perfectly predicted if the following occurs: i) the regressed b-box sits perfectly on the ground truth b-box, and ii) the ENTITY embedding in both detections in both views are identical. However, not all predictions are perfect by the loss function. Thus, the "penalty" can be applied to loss function to "improve" the prediction. This concept will be explained in greater details regarding to entity and penalty component 211 (FIG. 2).

In summary, the function of detection component 111 includes: i) introducing a penalty term to an object localization model and wherein the penalty term encourages the model to identify same physical regions (actual same physical location in the patient's body) in multiple images, which create an image of the same organ, ii) a step of outputting an entity embedding by a Region of Interest (ROI) sub-component of the model, in addition to conventional classification and localization prediction and iii) a step of encouraging similar entity embedding for the same logical entity, and discouraging similar entity embedding for different logical entities, during optimization process.

Database 116 is a repository for data used by detection component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within image detection model environment 100, provided that detection component 111 has access to database 116. Database 116 may store information associated with, but is not limited to, radiology reports and results, notes relating to the prognosis by the doctor, multiple medical image data, regression equations and functions, regression models associated with medical image detection, benchmark datasets and testing datasets associated with medical image models.

FIG. 2 is a functional block diagram illustrating detection component 111 in accordance with an embodiment of the present invention. In the depicted embodiment, detection component 111 includes entity and penalty component 211, medical image data component 212 and training component 213.

As is further described herein below, entity and penalty component 211 of the present invention provides the capability of creating and applying an ENTITY term (i.e., forcing the network to output, per anchor, values that represents the "identity" of physical entity) and the concept of PENALTY (i.e., using a loss function to determine the prediction). Essentially an ENTITY term (see 312 of FIG. 3) is a newly modified "anchor", called an "identity vector", that is output by a modern detection model of a neural network (see FIG. 3). Typically, a detection model provides an output (e.g., location, size, etc.) with many possible b-box. Basically, the model provides an output for every location in the image and for multiple size/shapes of possible b-box. One of the outputs represents the "identity" (i.e., 312 of FIG. 3) of the finding. For example, if there is one lesion based on two views from a mammogram then entity and penalty component 211 make sure that the system moves towards a good representation of this identity. What is the ideal representation? For example, if the network outputs an identity vector [0.4, 0.4, 0.9] only on the anchors that overlap (enough) with the ground truth entities and it outputs very different identity vectors on everything else, then it means that the network "understands" that they are the same physical entity, and it helps the overall performance.

Creating and applying an ENTITY term by entity and penalty component 211 can conform the following principles/rules, i) same logical/physical entity should be identical: a) can occur in overlapping anchors on the same view, or b) in same logical lesions on different views; and ii) a different logical/physical entities should be different based on: a) different logical entities on the same view and b) different logical entities on different view. For example, constructing an ENTITY term, it can be further illustrated with the first step: 1) going over all pairs of actual ground truth entities, both inter-view and intra-view. Ground truth entities are locations in images (e.g., CC and MLO view of a mammogram) in which there is a real finding (i.e., cancer lesion). For example, in a given pair of images (e.g., image_1 and image_2) from a mammogram, there are ground truth objects. Image_1 and image_2 contains a single physical tumor in the chest. The "ground truth objects" are the locations of this object (i.e., a contour or a bounding-box) in both images. Thus, in total, there are two ground truth objects. In another example, using the same images (e.g., image_1 and image_2) but instead of one tumor, there are two physical tumors: a total of four ground truth objects.

Step 1), "going over all pairs . . . ," refers for the neural network to reviewing/learning the "pair" of ground truth entities (i.e., both views of CC and MLO). The ground truth entity (assuming there is only one real lesion for the entire chest) would be a) the bounding-box of the finding in CC view and b) bounding-box of the finding in MLO view.

An example of the concept of PENALTY, as it relates to ENTITY term, is penalizing a neural networks loss function with a calculated "penalty value" during testing of sample (s). Thus, designing a loss function for the neural network can conform to the main goals (i.e., correct classification) and defined addition parameters that may affect the loss function. For example, if the original loss function is defined as "L_orig", then embodiment can define/calculate a total penalty (for the loss function) as "New_L=L_orig+penalty", where in the penalty value is a calculated term based on at least two vectors. Using a scenario where there are two views from a mammogram, CC and MLO, assume that the neural network makes a prediction for an anchor that matches a lesion (i.e., ground truth entity) on the CC view and created an identity vector, V_a=[A1, A2, A3]. Additionally, the same neural network predicts for an anchor that matches a lesion on MLO view and has identity vector V_b=[B1, B2, B3]. Now, the goal is for the neural network to output the exact same values as the identity for those cases because it is the same physical entity. Thus, to make sure the loss function penalizes more when the prediction is further off (inversely, has zero penalty if they are identical), the system can use the following algorithm: New_L=L_orig+ distance between vectors (V_a, V_b). The primary goal of the optimization process is to minimize the loss function with this "penalty value."

In a further example, if it's the same logical entity (i.e., same entity between two views, or overlapping anchors on the same view) then penalize a distance metric between the output embedding of anchors that overlap (over a predefined distance threshold) with the ground truth entity (e.g., L1, L2, cosine distance). It is noted that the distance threshold is user selectable and adjustable.

The following concepts/rules can be used to further to define a loss function: i) if it's a different logical entity—penalize according to the inverse such embedding distance metric and ii) per anchor that does not intersect (above a predefined intersection distance threshold) with a ground truth entity, penalize according to the embedding distance metric between this anchor and all other anchors that do intersect. It is noted that the distance threshold is user selectable and adjustable.

Is noted that if N is the number of the total entities then, there can be $N^2$ pairs based on the concept of "same logical/physical entity should be identical" and N* non-intersecting-anchors based on the concept of "different logical/physical entities should be different". Furthermore, to reduce training time, a different version can be used in which a subset of pairs is used on each training step. For example, the training step could be, a) taking the hardest examples (worst performing in terms of calculated loss) or b) a stochastic process that randomly selects a subset.

As is further described herein below, medical image data component 212 of the present invention provides the capability communicating (i.e., sending and receiving data) with client computing device 102. Data can include medical imaging data associated with patients. Furthermore, medical image data component 212 can determine/identify a known lesion (based on a radiologist's notation and other medical data) and mark that location on the medical image. It is noted that medical image data component 212 is not determining whether the images contain a lesion/cancer but it is marking (via embedding information) the location of a known lesion/cancer (i.e., ground truth entities) in the image.

As is further described herein below, training component 213 of the present invention provides the capability of training the system after adding and embedding ENTITY and PENALTY terms. Training component 213 can utilize any existing machine learning/training approach (e.g., supervised, unsupervised, etc.) based on confirmed benchmark dataset (i.e., confirmed lesion in the medical images). For example, after entity and penalty component 211 calculates a penalty value, training component 213 uses the penalty value to train (i.e., via a loss function) to improve detection accuracy of a lesion from medical images.

Figure 3:
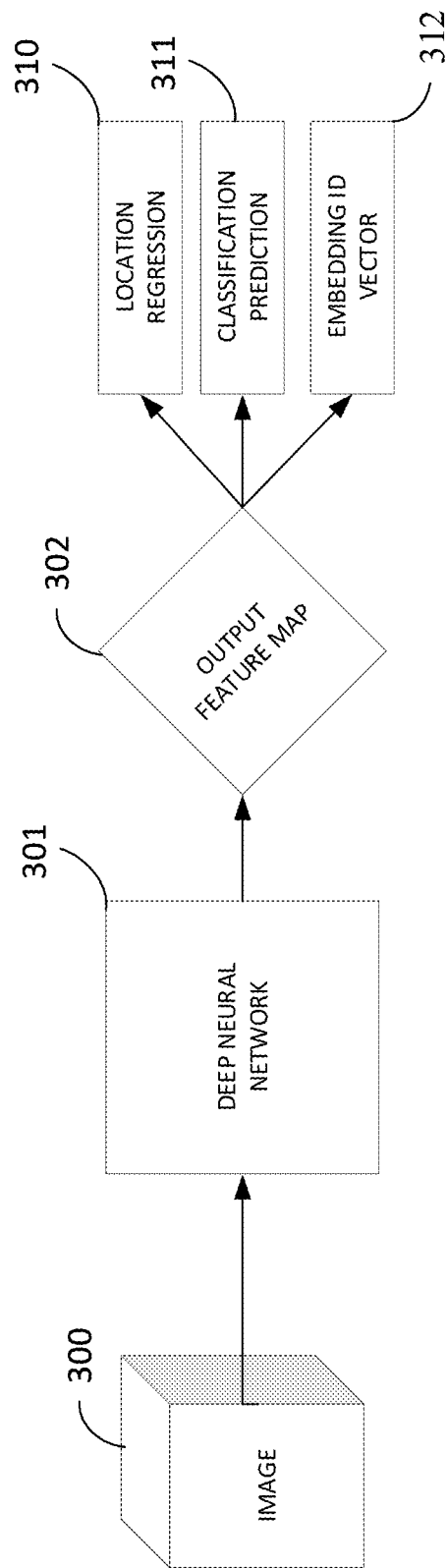
FIG. 3 is a functional block diagram illustrating image detection via CNN with the addition of functionality of detection component 111, in accordance with an embodiment of the present invention.

FIG. 3 is a functional block diagram illustrating image detection via CNN with the addition of functionality of detection component 111, in accordance with an embodiment of the present invention. The image (i.e., 300) is analyzed by a deep neural network (i.e., 301) and the deep neural network creates various features called output feature map (i.e., 302). Typically, in a RNN or CNN platform, the network creates at least two features: location regression (i.e., 310) and classification prediction (i.e., 311). However, embodiment of the invention "creates" a new anchor, identity vector (i.e., 312) to help improve with the learning accuracy by the neural network.

Figure 4:
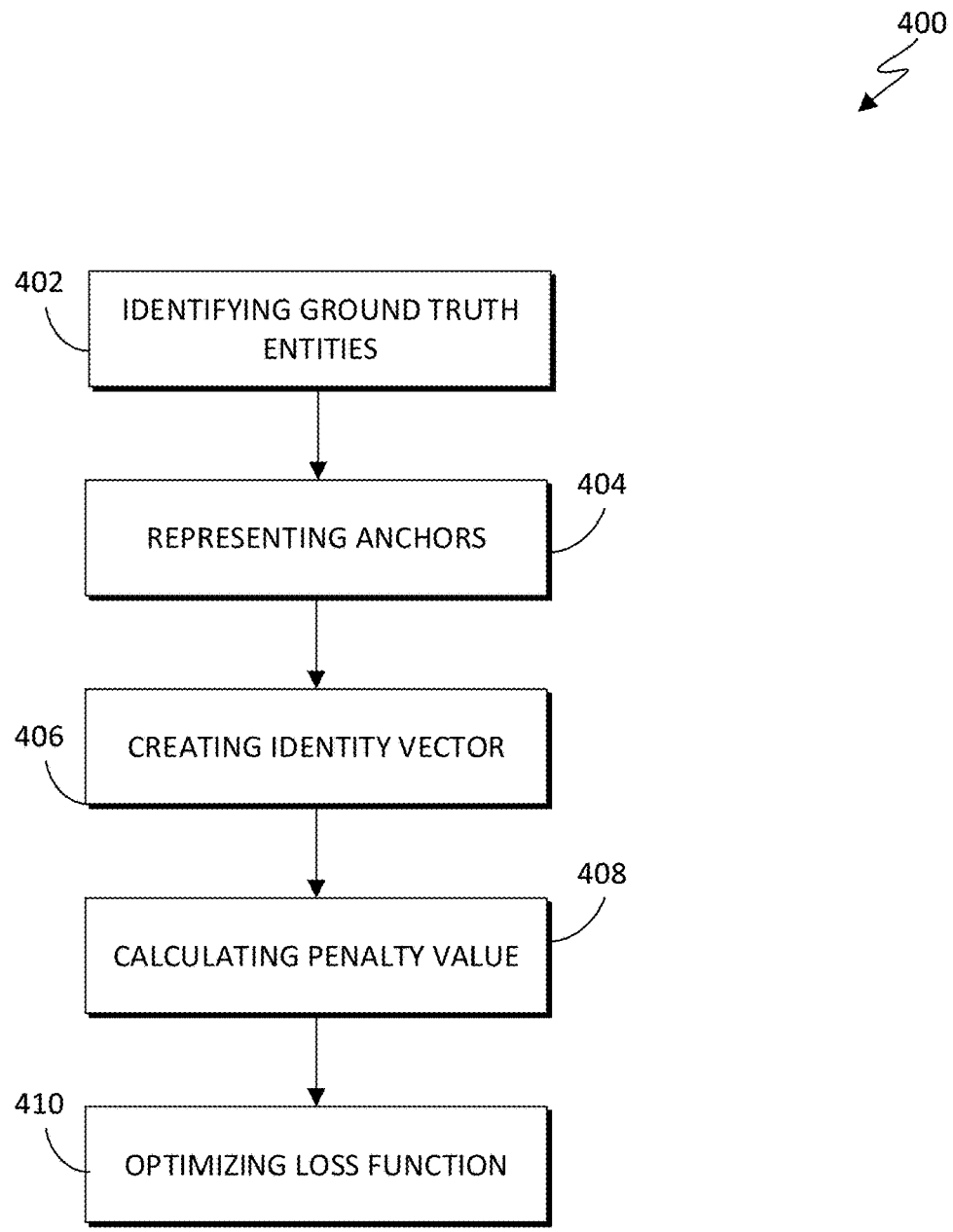
FIG. 4 is a high-level flowchart illustrating the operation of server 110, designated as 400, in accordance with an embodiment of the present invention.

FIG. 4 is a flowchart illustrating the operation of detection component 111, designated as 400, in accordance with another embodiment of the present invention.

Detection component 111 identifies ground truth entities (step 402). In an embodiment, detection component 111, through medical image data component 212, identifies ground truth entities (e.g., lesions, tumor, etc.) by tagging the medical images based on the notation from the doctor (i.e., radiologist).

Detection component 111 represents anchors (step 404). In an embodiment, detection component 111, modifies (i.e., represents) existing anchors to represent possible objection locations as bounding boxes on the medical images. These existing anchors are typical anchors used by RNN and/or CNN system for image analysis/detection. These existing anchors typically would contain the position, size and classification vector (usually one scalar per possible class).

Detection component 111 creates identity vectors (step 406). In an embodiment, detection component 111, through entity and penalty component 211, creates (modifying existing anchors) an identity vector by embedding a modified anchor (from step 404) with 1 k information to denote identity. Identity information contains additional information (e.g., location, size, etc.) to describe the entity (i.e., lesion).

Detection component 111 calculates penalty value (step 408). In an embodiment, detection component 111, through entity and penalty component 211, calculates the penalty value based on the location of at least two identity vectors (created in step 406). The formula used to calculate the penalty value is based on a formula, new_distance=original_distance+distance between identity vectors, wherein the distance between the first identity vector and second identity vector are calculated using a cosine distance function.

Detection component 111 optimizes a loss function (step 410). In an embodiment, detection component 111, through training component 213, Uses the penalty value to minimize the loss function during training of a neural network image detection system.

Figure 5:
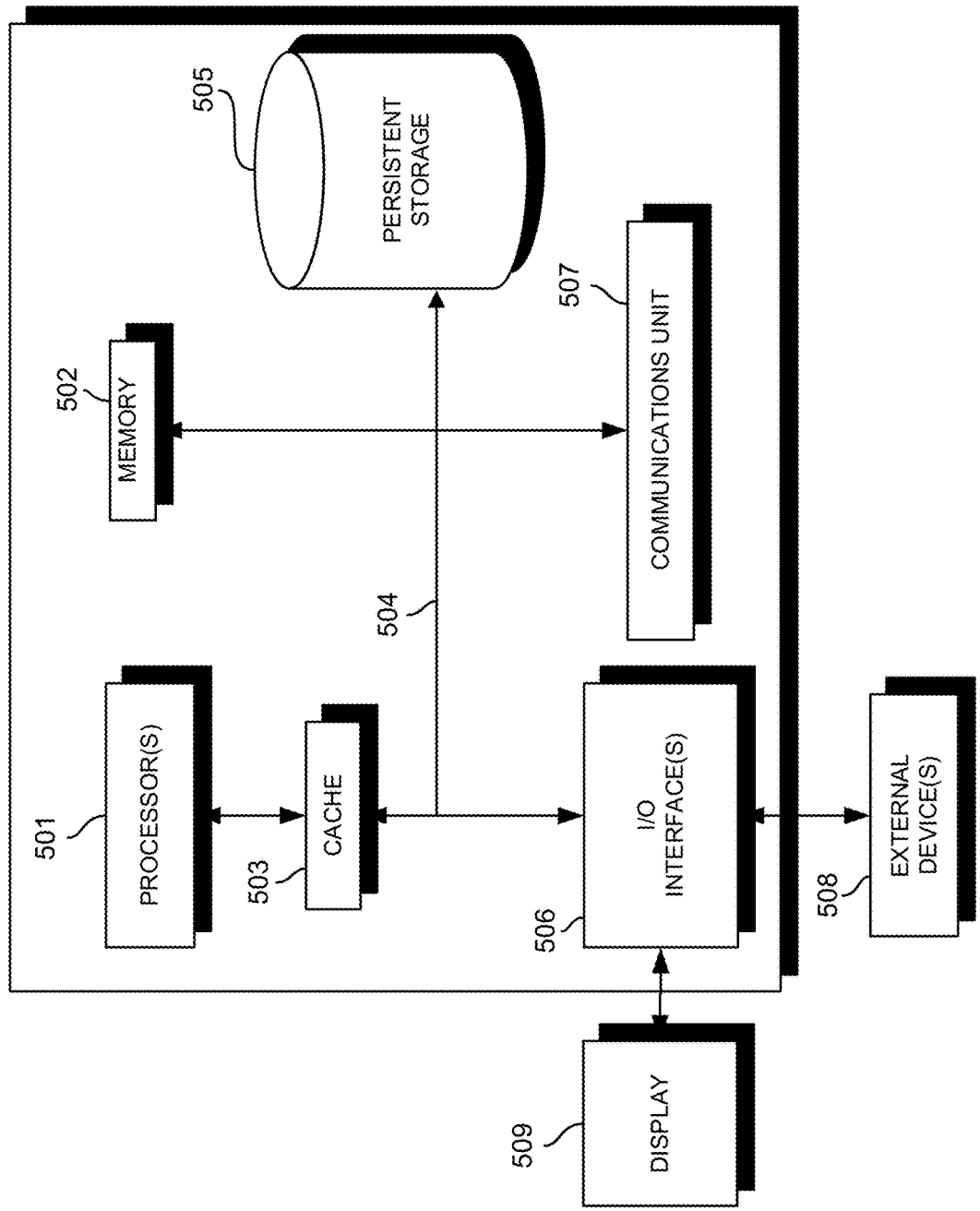
FIG. 5 depicts a block diagram, designated as 500, of components of a server computer capable of executing the detection component 111 within the image detection model environment, of FIG. 1, in accordance with an embodiment of the present invention.

FIG. 5, designated as 500, depicts a block diagram of components of detection component 111 application, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data x10) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Detection component 111 can be stored in persistent storage 505 for access and/or execution by one or more of the respective processor(s) 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., Detection component 111) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., Detection component 111) used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for optimizing a loss function associated with image analysis, the computer-method comprising:
   identifying one or more ground truth entities based on one or more image data;
   representing, using a machine-learning model, one or more anchors associated with the ground truth entities;
   creating, on top of a classification of the machine learning model, a first identity vector and a second identity vector based on one or more modified anchors;
   determining whether the one or more ground truth entities match each other based on a prediction by a neural network;
   in responsive to the one or more ground truth entities do match each other, calculating a penalty value based on the first identity vector and the second identity vector;
   optimizing a loss function of the machine learning model based on the penalty value, wherein the penalty value minimizes the loss function; and
   in responsive to the one or more ground truth entities do not match each other, penalizing the loss function based on an inverse length of a predefined intersection distance metric.

2. The computer-implemented method of claim 1, wherein identifying one or more ground truth entities based on image data further comprises:
   detecting one or more lesions based on the image data; and
   tagging the one or more lesions as the one or more ground truth entities.

3. The computer-implemented method of claim 1, wherein representing, using a machine-learning model, one or more anchors associated with the ground truth entities further comprises:
   modifying one or more existing anchors with one or more bounding boxes.

4. The computer-implemented method of claim 1, wherein creating a first identity vector and a second identity vector based on the one or more anchors further comprises:
   embedding identity information in the one or more anchors.

5. The computer-implemented method of claim 1, calculating the penalty value based on the first identity vector and the second identity vector further comprises:
   determining whether distance between the first identity vector and the second identity vector is above a distance threshold; and
   responsive to the determining that the first identity vectors and the second identity vector is not above the distance threshold, calculating the penalty value based on a penalty formula, new_distance=original_distance+distance between identity vectors, wherein the distance between the first identity vector and second identity vector are calculated using a cosine distance function.

6. The computer-implemented method of claim 1, wherein optimizing the loss function based on the penalty value further comprises:
   using the penalty value to minimize the loss function during training of a neural network image detection system.

7. The computer-implemented method of claim 1, wherein the one or more image data further comprises of multiple medical images associated with radiology.

8. The computer-implemented method of claim 1, wherein the one or more ground truth entities further comprises a lesion, cancer and tumor.

9. A computer program product for optimizing a loss function associated with image analysis, the computer program product comprising:
   one or more computer readable and non-transitory storage media and program instructions stored on the one or more computer readable and non-transitory storage media, the program instructions comprising:
   program instructions to identify one or more ground truth entities based on one or more image data;
   program instructions to represent, using a machine-learning model, one or more anchors associated with the ground truth entities;
   program instructions to create, on top of a classification of the machine learning model, a first identity vector and a second identity vector based on one or more modified anchors;
   program instructions to determine whether the one or more ground truth entities match each other based on a prediction by a neural network;

in responsive to the one or more ground truth entities do match each other, program instructions to calculate a penalty value based on the first identity vector and the second identity vector;

program instructions to optimize a loss function of the machine learning model based on the penalty value wherein the penalty value minimizes the loss function; and in responsive to the one or more ground truth entities do not match each other, program instructions to penalize the loss function based on an inverse length of a predefined intersection distance metric.

10. The computer program product of claim 9, wherein program instructions to identify one or more ground truth entities based on image data further comprises:

program instructions to detect one or more lesions based on the image data; and program instructions to tag the one or more lesions as the one or more ground truth entities.

11. The computer program product of claim 9, wherein program instructions to represent, using a machine-learning model, one or more anchors associated with the ground truth entities further comprises:

program instructions to modify one or more existing anchors with one or more bounding boxes.

12. The computer program product of claim 9, wherein program instructions to create a first identity vector and a second identity vector based on the one or more anchors further comprises:

program instructions to embed identity information in the one or more anchors.

13. The computer program product of claim 9, program instructions to calculate the penalty value based on the first identity vector and the second identity vector further comprises:

program instructions to determine whether distance between the first identity vector and the second identity vector is above a distance threshold; and responsive to the determine that the first identity vectors and the second identity vector is not above the distance threshold, program instructions to calculate the penalty value based on a penalty formula, new_distance=original_distance+distance between identity vectors, wherein the distance between the first identity vector and second identity vector are calculated using a cosine distance function.

14. The computer program product of claim 9, wherein program instructions to optimize the loss function based on the penalty value further comprises:

program instructions to use the penalty value to minimize the loss function during training of a neural network image detection system.

15. A computer system for optimizing a loss function associated with image analysis, the computer system comprising:

one or more computer processors;
one or more computer readable storage media;
program instructions stored on the one or more computer readable storage media for execution by at least one of the one or more computer processors, the program instructions comprising:

program instructions to identify one or more ground truth entities based on one or more image data;

program instructions to represent, using a machine-learning model, one or more anchors associated with the ground truth entities;

program instructions to create, on top of a classification of the machine learning model, a first identity vector and a second identity vector based on one or more modified anchors;

program instructions to determine whether the one or more ground truth entities match each other based on a prediction by a neural network;

in responsive to the one or more ground truth entities do match each other, program instructions to calculate a penalty value based on the first identity vector and the second identity vector;

program instructions to optimize a loss function of the machine learning model based on the penalty value wherein the penalty value minimizes the loss function; and in responsive to the one or more ground truth entities do not match each other, program instructions to penalize the loss function based on an inverse length of a predefined intersection distance metric.

16. The computer system of claim 15, wherein program instructions to identify one or more ground truth entities based on image data further comprises:

program instructions to detect one or more lesions based on the image data; and program instructions to tag the one or more lesions as the one or more ground truth entities.

17. The computer system of claim 15, wherein program instructions to represent, using a machine-learning model, one or more anchors associated with the ground truth entities further comprises:

program instructions to modify one or more existing anchors with one or more bounding boxes.

18. The computer system of claim 15, wherein program instructions to create a first identity vector and a second identity vector based on the one or more anchors further comprises:

program instructions to embed identity information in the one or more anchors.

19. The computer system of claim 15, program instructions to calculate the penalty value based on the first identity vector and the second identity vector further comprises:

program instructions to determine whether distance between the first identity vector and the second identity vector is above a distance threshold; and responsive to the determine that the first identity vectors and the second identify identity vector is not above the distance threshold, program instructions to calculate the penalty value based on a penalty formula, new_distance=original_distance+distance between identity vectors, wherein the distance between the first identity vector and second identity vector are calculated using a cosine distance function.

20. The computer system of claim 15, wherein program instructions to optimize the loss function based on the penalty value further comprises:

program instructions to use the penalty value to minimize the loss function during training of a neural network image detection system.

* * * * *